United States Patent [19]

Freude

[11] 4,320,405
[45] Mar. 16, 1982

[54] WRITING DEVICE FOR RECORDERS, MEASURING INSTRUMENTS AND THE LIKE

[75] Inventor: Paul Freude, Duren-Birgel, Fed. Rep. of Germany

[73] Assignee: DIA-Nielsen GmbH Zubehör für die Messtechnik, Duren, Fed. Rep. of Germany

[21] Appl. No.: 92,224

[22] Filed: Nov. 7, 1979

[30] Foreign Application Priority Data

Nov. 30, 1978 [DE] Fed. Rep. of Germany ... 7835494[U]

[51] Int. Cl.³ ............................................. G01D 15/16
[52] U.S. Cl. .................. 346/140 A; 401/48; 401/134
[58] Field of Search .......................... 401/48, 258–260, 401/196, 132–135; 346/140 R, 140 A

[56] References Cited

U.S. PATENT DOCUMENTS

| | | | |
|---|---|---|---|
| 3,140,912 | 7/1964 | Davis et al. | 401/134 X |
| 3,399,019 | 8/1968 | Koelichen | 401/134 |
| 3,610,765 | 10/1971 | Bok | 346/140 A X |
| 3,788,753 | 1/1974 | Stewart | 401/260 X |
| 4,048,640 | 9/1977 | Caldwell | 346/140 A |
| 4,100,549 | 7/1978 | Hubbard | 346/140 A |
| 4,188,408 | 1/1980 | Pelensky et al. | 346/140 A |

*Primary Examiner*—Edward M. Coven
*Attorney, Agent, or Firm*—Frishauf, Holtz, Goodman & Woodward

[57] ABSTRACT

Recording or measuring equipment is provided with a spring clamp or clip for holding a replaceable writing unit by the ink reservoir of the writing unit. The reservoir carries a pen with a fiber or laminar tip and has a vent at or near the end shaped for insertion in the clamp or clip. A plug equipped with a gripping knob is inserted in the vent and the vent is so located that when the plug is so inserted, the ink reservoir cannot be inserted into and held by the clamp or clip, thus assuring that the vent is opened before the pen goes into use.

7 Claims, 6 Drawing Figures

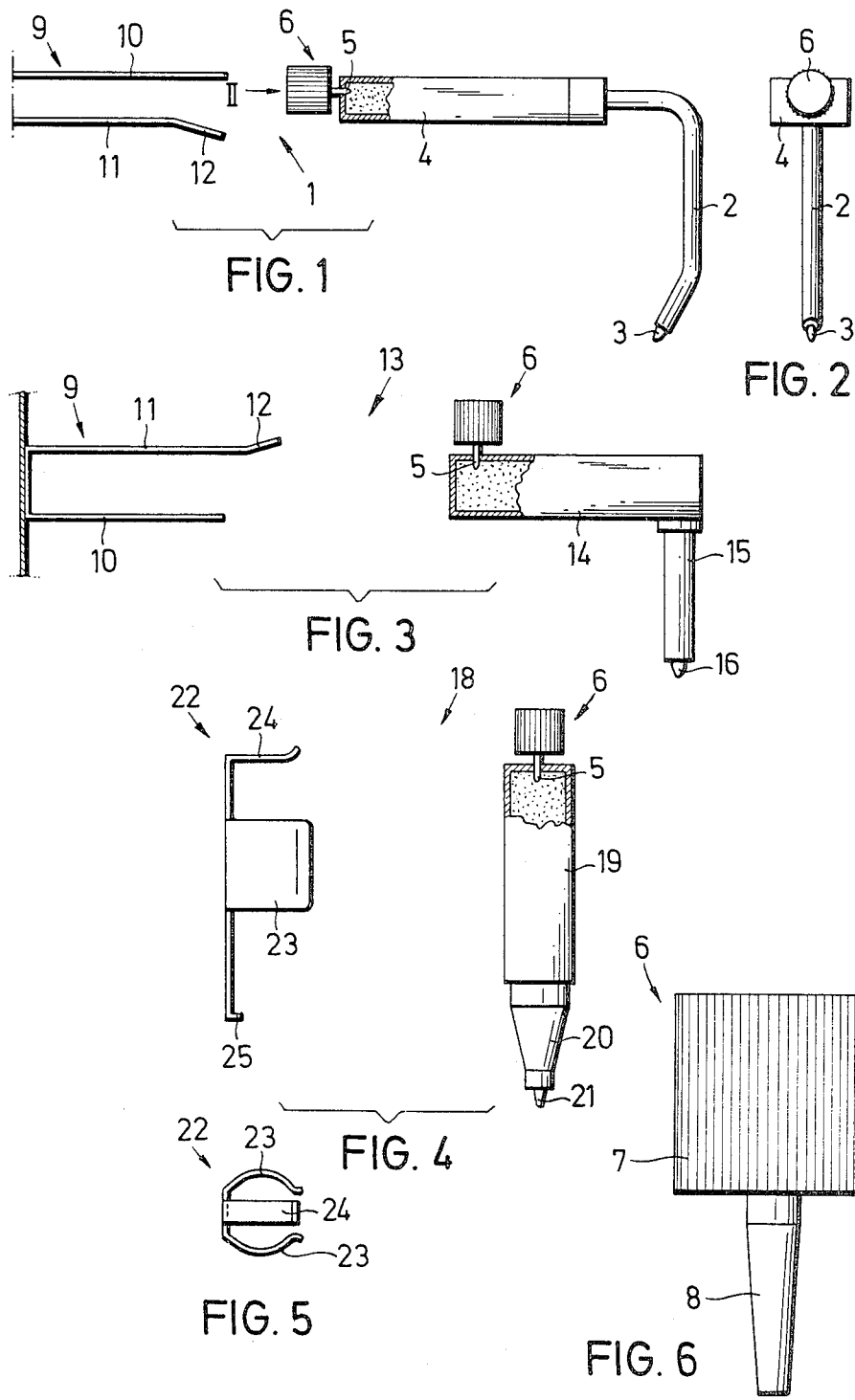

WRITING DEVICE FOR RECORDERS, MEASURING INSTRUMENTS AND THE LIKE

The invention concerns a writing device for recorders, measuring instruments, etc., comprising a fiber- or laminar-tipped pen, and a ink reservoir which has a vent that is closed until used and is designed to be opened at the time of first use.

Writing devices for recorders, measuring instruments, etc., serving for the regular or occasional recording of measured values on a recording tape or the like must be of a special design to obtain a line or separate marks with complete reliability when the recording is subject to interruption or takes place intermittently. As known, a fiber- or laminar-tipped recording pen is usually connected with an ink reservoir providing the pen with ink and keeping it ready for use. It is quite usual to design the writing device comprising pen and ink reservoir so as to be easily interchangeable and to constitute a disposable unit. To this effect, the ink reservoir with the pen may be stored in readiness for eventual use sooner or later.

Ink reservoirs, when used, must have a vent permitting the ink to flow freely to the fiber- or laminar-tipped pen. When the pen-ink-reservoir-unit is in storage, the vent should remain closed to avoid drying of the ink by escape of the volatile components contained in the ink. It has been known to keep vented ink reservoirs closed by an aluminum sheet packing or the like. A tight seal is often not provided by such packing. On the other hand, the vent aperture may be closed by the material of the ink reservoir. When a writing pen with a closed ink reservoir is put into use, the membrane is pierced by a needle at a designated piercing point to open the vent. It is also possible to keep the vent closed by other means until the ink reservoir is used. With the known measures, however, the risk of using the pen with the ink reservoir while, by carelessness or the like, the ink reservoir vent is not open is not eliminated. For instance, no needle may be available to perforate the reservoir or no knife or shears to cut off a nipple. The writting pen with the ink reservoir can thus be put into use with the vent closed and the state of the vent may thereafter be overlooked so that the vent is never opened or is opened only after a certain time of operation. In all of these cases, serious trouble may well result, for example by failure of recording and the impossibility of restoring the lost measured values, for example in the case of an unstable operation. With the supposition that the pen is inoperative anyhow, the result may be a premature disposal of the pen unit.

SUMMARY OF THE INVENTION

It is the object of the invention to provide a writing device for recorders or the like of the type having a fiber pen and in ink-reservoir in which the errors in handling leading to malfunction are prevented and in which it is assured that when the writing pen is put into use, the vent aperture of the ink reservoir will be open. Briefly, the vent of the ink reservoir is closed by a plug fitted to the ink reservoir and the mounting for reservoir and pen is so constituted, and the plug so located, that the mounting can receive the ink reservoir (and hence mount the pen) only when the plug is removed.

Such a design of the writing device and of the arrangement of its elements ensures that the writing pen cannot be put into use without an open vent providing for reliable function of the pen. In other words, the writing pen cannot be even temporarily operative unless the ink reservoir has an open vent aperture. The plug provides at the same time for a reliable sealing of the vent aperture when the writing pen is taken out of use, until it is again put into use. Thus, when the writing pen is in storage, the ink cannot escape or evaporate. The vent can be easily and safely sealed by the plug, which can be of simple construction. The plug can be designed to be so large or so long as to safely prevent proper clamping of the writing pen in the reservoir mounting.

According to an additional feature of the invention, the mounting of the ink reservoir may be a clamp or clip or the like. The vent and the plug are arranged at a site within the path of a leg of the clamp or clip. If the ink reservoir must be inserted, for example, in the longitudinal direction of the clamp or the like, the plug of the ink reservoir may be fitted eccentrically with respect to its front face or at its lateral face where a leg of the clamp will cover the ink reservoir.

According to another embodiment, the mounting may be provided with an appendage at a site where the plug would be when the ink reservoir is inserted in the mounting. In this case, the ink reservoir for the writing pen cannot be inserted or placed into the mounting when the plug is still in the ink reservoir. It is made absolutely necessary to remove the plug to hold the ink reservoir on the writing device prior to putting the pen into use as an operative writing device.

It is advantageous for the design of the plug for its shaft to be, preferably, of tapered shape and to have a handle portion or knob having a diameter substantially larger than that of the shaft. In a manner known per se, the surface of the handle portion may be rough, for example knurled. The diameter of the handle portion of the plug may be two to five times the diameter of the shaft. The larger the handle portion of the plug, the more sure is the precaution of the invention.

The invention is further explained below by way of examples illustrated in the annexed drawings, in which:

FIG. 1 shows a schematic view of an embodiment of the writing device of the invention comprising a pen and a mounting;

FIG. 2 is a front view of the ink reservoir in direction of arrow II of FIG. 1;

FIG. 3 shows a schematic plan view of another embodiment of the object of the invention;

FIG. 4 shows a schematic view of a third embodiment of the object of the invention;

FIG. 5 is a schematic top view of the mounting of the embodiment shown in FIG. 4, and FIG. 6 shows, on a larger scale, an embodiment of a sealing plug used in the invention.

The writing device 1 for recorders, measuring instruments and the like comprises a pen 2 having a tip of fiber or laminar material and an ink reservoir 4 forming parts of a combined unit, the ink reservoir 4 being provided with a vent aperture 5 kept closed by a plug 6 when the ink reservoir 4 is out of use. The plug 6 is composed of a handle portion 7 and a shaft 8, which may be slightly conical. For its easier manipulation, the periphery of the handle portion 7 is knurled.

In the illustrated example, the mounting 9 for the pen by its ink reservoir is a clamp 9 comprising legs 10 and 11. Preferably, at least one leg has a deflected end 12. The plug 6 is so fitted at the ink reservoir 4 with respect to the configuration of the mounting 9 that the reservoir end can be introduced into the clamp 9 only if the plug 6 is removed. For this purpose, the vent aperture 5 and the plug 6 are shown disposed eccentrically at the mounting side or end of the ink reservoir 4 so that at one side, the knob 7 of the plug projects beyond the contour of the ink reservoir to such an extent that the ink reservoir 4 provided with the plug 6 cannot be inserted into the clamp 9. Only upon the removal of the plug 6 from the vent 5 can the ink reservoir 4 be introduced into the clamp 9 and securely seized therein.

In the embodiment of FIG. 3, the writing device 13 comprising the ink reservoir 14 and the writing pen 15 having a fiber or laminar tip 16 is provided at one lateral face with the vent 5 which may be kept closed by the inserted plug 6. Again, a clamp or clip 9 is the mounting into which the ink reservoir 14 may be introduced for holding the combined unit in working positions. This is, however, impossible with the plug 6 present in the vent 5 because upon attempts to insert the ink reservoir 13 into the clamp 9, the plug 6 will abut against the leg 11,12. As a result, the operator's attention will be drawn immediately to the fact that the vent is still closed by the plug 6. Only upon removal of the plug 6 may the ink reservoir 14 with pen 15,16 be inserted into the mounting 9. Thus, it is assured that the vent aperture is open when the reservoir and pen are in position for use.

The embodiment of FIGS. 4 and 5 shows a writing device 18 comprising an ink reservoir 19 which may be cylindrical leading into the pen 20 with its fiber or laminar tip 21. The mounting for the unit is a spring clip 22 comprising bent spring elements 23 designed to hold the reservoir 19 by snap effect. The upper end of the mounting 22 is provided with an appendage 24 forming an obstacle to plug 6 when the ink reservoir 19, with the plug still in place, is introduced into the clip 22. Correct retention of the ink reservoir 19 by the mounting 22 is only possible when the plug 6 is removed. An additional short appendage 25 prevents the ink reservoir with the plug from being inserted in a low position into the mounting 22 in which the ink reservoir might take an inclined position in which it could not be safely held by means of the spring elements 23.

The size and shape of the plug 6 can be whatever is effective to render it impossible to introduce the ink reservoir 4 and its pen into the mounting for the unit when the plug seals the vent. It is possible to use a variety of different stopper shapes instead of the illustrated plug, for example, a cap for an annular venting appendage, all such variations coming under the designation "plug" as used herein. A plug of the kind illustrated, however, has proved to be extraordinarily useful for the practice of the invention.

I claim:

1. A writing device for recording or measuring equipment, which includes means for holding a replaceable writing device by the ink reservoir thereof, said writing device comprising:

an ink reservoir (4,14,19) having a vent aperture (5) and shaped to fit into said holding means;
   a pen (2,15,20) extending from and carried by said reservoir and having a tip (3,16,21) of ink-permeable material; and
   a plug (6) for sealing said vent aperture when said device is not in use, said aperture being so located in a portion of said reservoir fitting said holding means that when said plug is fitted in said aperture to seal said aperture, said plug interferes with said holding means of said equipment and prevents said reservoir from being held in said holding means, said plug having a shaft (8) fitting said aperture and a grip portion (7) connected thereto and extending radially beyond the circumference of said shaft entirely therearound whereby for any rotated position of the inserted plug, said reservoir is prevented from being held in said holding means.

2. A writing device as defined in claim 1, in which said plug (6) has a tapered shaft (8) and a grip knob (7) having diameter substantially larger than that of said shaft and having a roughened surface.

3. A writing device as defined in claim 2, in which the diameter of said knob (7) of said plug (6) is between two and five times the maximum diameter of said shaft (8).

4. A writing apparatus for recording or measuring equipment comprising:

holding means for holding a replaceable ink reservoir and forming part of said recording measuring equipment;
   an ink reservoir having a portion shaped to fit into said holding means and having a pen mounted thereon carrying at its extremity a tip of ink-permeable material, said reservoir having also a vent aperture and being provided with a plug (6) for sealing said vent aperture when the writing device is not in use, said plug having a shaft (8) fitting said vent aperture, and said writing apparatus further comprising the improvement consisting in that;
   said aperture and plug are so located and disposed on said portion of said reservoir fitting into said holding means as to prevent said holding means from holding said ink reservoir when said plug is in position for sealing said vent aperture, said plug having a grip portion (7) connected thereto and extending radially beyond the circumference of said shaft entirely therearound, whereby for any rotated position of said holding means is prevented from holding said plug said reservoir.

5. A writing apparatus as defined in claim 4, in which said holding means is in the form of a clamp or clip having a pair of opposed legs, and in which said vent aperture is located on said reservoir at a site such that when said plug is in position in said aperture, an attempt to insert said reservoir in said holding means necessarily brings said plug in the path of one leg of said holding means.

6. A writing apparatus as defined in claim 4, in which said holding means is in the form of an elongated clamp or clip and in which said ink reservoir is of a configuration for insertion in the longitudinal direction of said clamp or clip and in which, further, said aperture is so disposed that when said plug is inserted therein, said plug is located eccentrically so as to extend laterally of said reservoir with respect to said longitudinal direction of insertion and so as to interfere with said clamp or clip and prevent insertion.

7. A writing apparatus as defined in claim 4, in which said holding means includes appendage means (24) for covering the site of said vent aperture of said reservoir when said reservoir is held in said holding means,, the configuration of said appendage means (24) being such as to stop the insertion of said reservoir into said holding means when said plug (6) is in said aperture, as the result of abutment of said appendage means against said plug.

* * * * *